United States Patent [19]

Hanson

[11] Patent Number: 5,528,501
[45] Date of Patent: Jun. 18, 1996

[54] SYSTEM AND METHOD FOR SUPPLYING TRAVEL DIRECTIONS

[75] Inventor: Bruce L. Hanson, Little Silver, N.J.

[73] Assignee: AT&T Corp., Murray Hill, N.J.

[21] Appl. No.: 218,288

[22] Filed: Mar. 28, 1994

[51] Int. Cl.⁶ .................................................. G06F 15/50
[52] U.S. Cl. ........................ 364/443; 364/444; 340/990; 340/995; 340/988
[58] Field of Search .................................. 364/443, 449, 364/444; 340/990, 988, 995

[56] References Cited

U.S. PATENT DOCUMENTS

| | | | |
|---|---|---|---|
| 4,757,455 | 7/1988 | Tsunoda et al. | 364/449 |
| 4,774,672 | 9/1988 | Tsunoda et al. | 364/449 |
| 4,914,605 | 4/1990 | Loughmiller, Jr. et al. | 364/443 |
| 4,937,753 | 6/1990 | Yamada | 364/443 |
| 5,067,081 | 11/1991 | Person | 364/444 |
| 5,115,399 | 5/1992 | Nimura et al. | 340/990 |
| 5,159,556 | 10/1992 | Schorter | 364/443 |
| 5,177,685 | 1/1993 | Davis et al. | 340/988 |
| 5,197,009 | 3/1993 | Hoffman, Jr. et al. | 364/443 |
| 5,231,584 | 7/1993 | Nimura et al. | 340/990 |
| 5,297,051 | 3/1994 | Arakawa et al. | 364/443 |

Primary Examiner—Kevin J. Teska
Assistant Examiner—Thai Phan
Attorney, Agent, or Firm—Eugene J. Rosenthal

[57] ABSTRACT

I have recognized that for travelers who are familiar with the area of the starting point or destination, i.e., the local areas of a trip, that the first or last several steps of the directions are unnecessary. Therefore, only those steps of the directions that the traveler really wants or needs are delivered to the traveler. Which steps are delivered is based on an indication of the traveler's familiarity with the roads in the area of the starting point and the roads in the area of the destination. To only deliver those steps of the directions that the traveler really needs, streets and highways, collectively herein "roadways", are assigned hierarchical values that indicate generally how well known or how well traveled they are. A set of steps that makes up the complete trip directions from the starting point to the destination is developed as in conventional direction supplying systems. However, in addition to the conventional information that is listed in the steps that make up the directions, the assigned hierarchical familiarity value of each roadway specified is also listed. A determination is then made, based on the listed hierarchical values of the roadways, as to which steps of the directions are to be delivered to the traveler.

14 Claims, 5 Drawing Sheets

FIG.2

| SEGMENT NAME (201) | LOCATION (209) | START POINT (203) | END POINT (203) | LANES (207) | FAMILIARITY RATING (205) | MILAGE |
|---|---|---|---|---|---|---|
| NJ HWY 35 | SHREWSBURY | JCT 520 | JCT 537 | 4 | 3 | 0.5 |
| SYCAMORE AVE | SHREWSBURY | JCT 35 | JCT BRANCH AVE | 4 | 2 | 0.3 |
| BRANCH AVE | SITTLE SILVER | JCT SYCAMORE | JCT 520 | 2 | 2 | 0.05 |

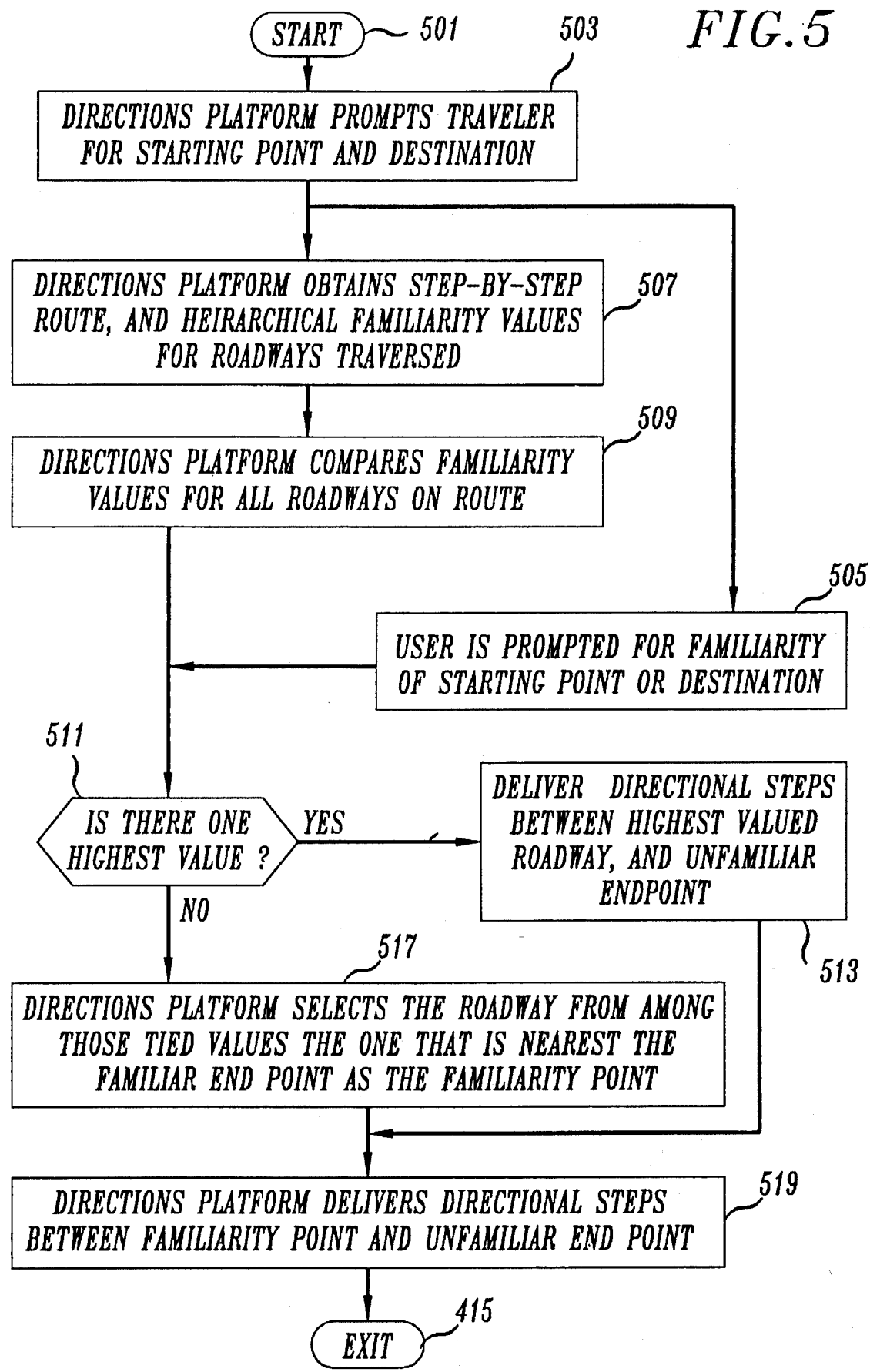

SYSTEM AND METHOD FOR SUPPLYING TRAVEL DIRECTIONS

TECHNICAL FIELD

This invention relates to the automated supplying of directions for travelers.

BACKGROUND OF THE INVENTION

Prior art direction services supply to a traveler automatically developed step-by-step directions for travel from a starting point to a destination. Typically these directions are a series of steps which detail, for the entire route, a) the particular series of streets or highways to be traveled, b) the nature and location of the entrances and exits to/from the streets and highways, e.g., turns to be made and exits to be taken, and c) optionally, travel distances and landmarks. In the context of this application, "automatically" means without human involvement in the development of the directions once the starting point, destination and any desired characteristics of the route, e.g., scenic, shortest or quickest, are known.

SUMMARY OF THE INVENTION

I have recognized that for travelers who are familiar with the area of the starting point or destination, i.e., the local areas of a trip, that the first or last several steps of the directions are unnecessary. In fact, the steps of the directions regarding the local areas may even conflict with the traveler's preferred choice of route. These unnecessary steps can add to the traveler's "cognitive load", possibly interfering with his memory and understanding of the subsequent, important, directional steps. Transmitting these unnecessary steps also increases the time required to deliver the directions, needlessly wasting the time of the directions delivery system and the directions recipient.

The foregoing problems can be avoided by, in accordance with the principles of the invention, only delivering those steps of the directions that the traveler really wants or needs. Which steps are delivered is based on an indication of the traveler's familiarity with the roads in the area of the starting point and the roads in the area of the destination.

To only deliver those steps of the directions that the traveler really needs, streets and highways, collectively herein "roadways", are assigned hierarchical values that indicate generally how well known or how well traveled they are. A set of steps that makes up the complete trip directions from the starting point to the destination is developed as in conventional direction supplying systems. However, in addition to the conventional information that is listed in the steps that make up the directions, the assigned hierarchical familiarity value of each roadway specified is also listed. A determination is then made, based on the listed hierarchical values of the roadways, as to which steps of the directions are to be delivered to the traveler.

In an exemplary embodiment of the invention, the traveler is offered to only be supplied with directions either a) from a main road nearest the starting point to the destination or b) from the starting point to the main road nearest the destination. If the traveler only needs directions in the area of the destination, e.g., the starting point is the traveler's home—an area with which the traveler is likely to be familiar—, the traveler is given directions from the main roadway nearest the starting point to the destination. This is achieved by having the system traverse the steps of the directions and supply to the traveler only those steps that come after the step in which the roadway with the highest assigned value that is closest to the starting point is reached. If the traveler only needs directions in the area of the starting point, e.g., the traveler is lost, the traveler is given directions from the starting point to the main roadway nearest the destination. This is achieved by having the system traverse the steps of the directions and supply to the traveler only those steps that detail how to proceed from the starting point until the step in which the exit on the roadway with the highest assigned value that is closest to the destination is reached.

BRIEF DESCRIPTION OF THE DRAWING

In the drawing:

FIG. 2 shows an exemplary structure for the information stored in the map database shown in FIG. 1;

FIG. 5 shows a flowchart of another particular exemplary process for implementing the invention.

DETAILED DESCRIPTION

Figure 1:
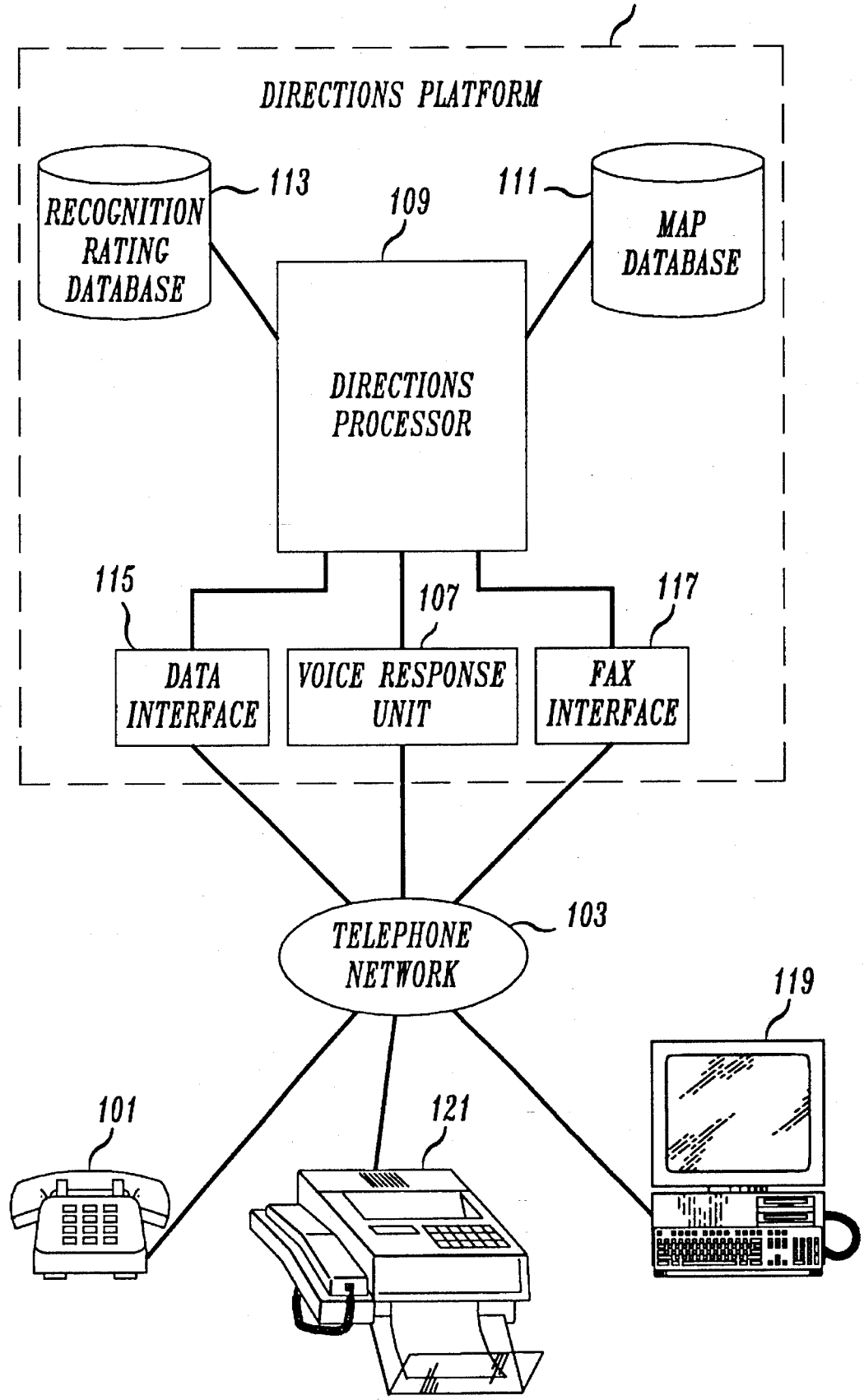
FIG. 1 shows an exemplary system for providing to a traveler only those steps of the directions that the traveler really needs in accordance with the principles of the invention.

FIG. 1 shows an exemplary system for providing to a traveler only those steps of the directions that the traveler really needs in accordance with the principles of the invention. Shown are 1) telephone 101, 2) telephone network 103 and 3) directions platform 105. A traveler requiring directions to a destination places a call from telephone 101 via telephone network 103 to directions platform 105. The shown exemplary implementation of directions platform 105 includes a) voice response unit 107 b) directions processor 109, and c) map database 111. Directions platform 105 may optionally include d) recognition rating database 113 e) data interface 115, and f) fax interface 117.

A traveler whose call is routed to the directions platform 105 is connected to voice response unit 107. Voice response unit 107 supplies verbal announcements or prompts to the caller who is requesting the directions, typically the traveler, and receives information supplied in response thereto by the traveler. The particular announcements or prompts supplied to the user are specified by directions processor 109. The information supplied by the traveler may be, for example, in the form of dual tone multi-frequency signals or speech signals. Voice response unit 107 translates the information supplied by the traveler into a format understood by directions processor 109 and transmits the translated information to directions processor 109.

Directions processor 109 causes voice response unit 107 to prompt the traveler to supply the starting point and destination of his trip. Voice response unit 107 relays a representation of the starting point and destination that it gathered from the traveler to directions processor 109. Directions processor 109 employs conventional routing algorithms and the map data stored in map database 111 for developing directions from the starting point to the destination.

FIG. 2 shows an exemplary structure for the information stored in map database 111. Map database 111 includes a) the name of each roadway segment 201, b) the location of the segment 209, e.g., the town in which it is located, c) the number of lanes 207, d) the length in miles of the segment (mileage) 211, and d) linking information 203 which describes the relationship of each roadway segment with the other roadways that it intersects. Also, in an exemplary embodiment of the invention, map database 111 includes for each roadway listed therein a hierarchical familiarity rating value 205 that indicates a) how well known, or b) how well traveled, the roadway is. These hierarchical values are assigned by the supplier of the direction service. For example, the hierarchical values may be the digits 1–4 which correspond to the following values: 1-minor local road, 2-major local road, 3-minor highway, and 4-major highway. Those of ordinary skill in the art will readily be able to assign hierarchical recognition or familiarity values to roadways. It is noted that a single roadway may be made up of many segments.

Directions processor 109 causes voice response unit 107 to query the traveler as to whether he is familiar with, and thus willing to forego directions in, the area of the starting point or the area of the destination. In accordance with the principles of the invention, only those steps of the directions which pertain to travel outside of the travelers area of familiarity are supplied from directions processor 109 to the traveler by voice response unit 107, telephone network 103 and telephone 101. If the traveler is familiar with the starting point area, directions processor 109 traverses the steps of the directions and only supplies to voice response unit 107 those steps that come after a determined point of familiarity in the starting point area. Likewise, if the traveler is familiar with the destination location, directions processor 109 traverses the steps of the directions and only supplies to voice response unit 107 those steps which detail how to proceed from the starting point until a determined point of familiarity is reached.

For example, in a particular embodiment of the invention, the step in which the roadway with the highest assigned value that is closest to the starting point is reached is taken to be the point of familiarity if the traveler is familiar with the starting point area. Also, the step on which the exit of the roadway with the highest assigned value that is closest to the destination is reached is deemed to be the point of familiarity if the traveler is familiar with the destination area.

In another embodiment of the invention, instead of storing the hierarchical values of the roadways in map database 111, the hierarchical values are stored in association with the roadways names in recognition rating database 113. After the steps of the directions from the starting point to the destination are determined, directions processor 109 accesses recognition rating database 113 for the recognition values corresponding to the roadway names for each of the steps. The process of determining the familiarity point and truncating the directions then proceeds as described above. Note that to conserve storage space the largest class of roadways, typically the smallest local streets, need not be listed in recognition rating database 113. Any roadway not found listed in recognition rating database 113 is automatically assigned the value of the omitted class.

In another embodiment of the invention, hierarchical values are not stored for the roadways. Instead, after the steps of the directions of the starting point to the destination are determined, directions processor 109 assigns a hierarchical familiarity value to each roadway based upon keywords in the roadway's name. For example, an interstate highway, e.g., "interstate highway 95", is assigned a value of 4 (major highway status) while a state highway, e.g., "state highway 35", is assigned a value of 3 (minor highway status). Other keywords may include, for example, turnpike, highway, parkway, boulevard, avenue, freeway, and expressway. The value assigned to a particular roadway may be augmented if the directions specify traveling over that particular roadway for a substantial distance.

Figure 3:
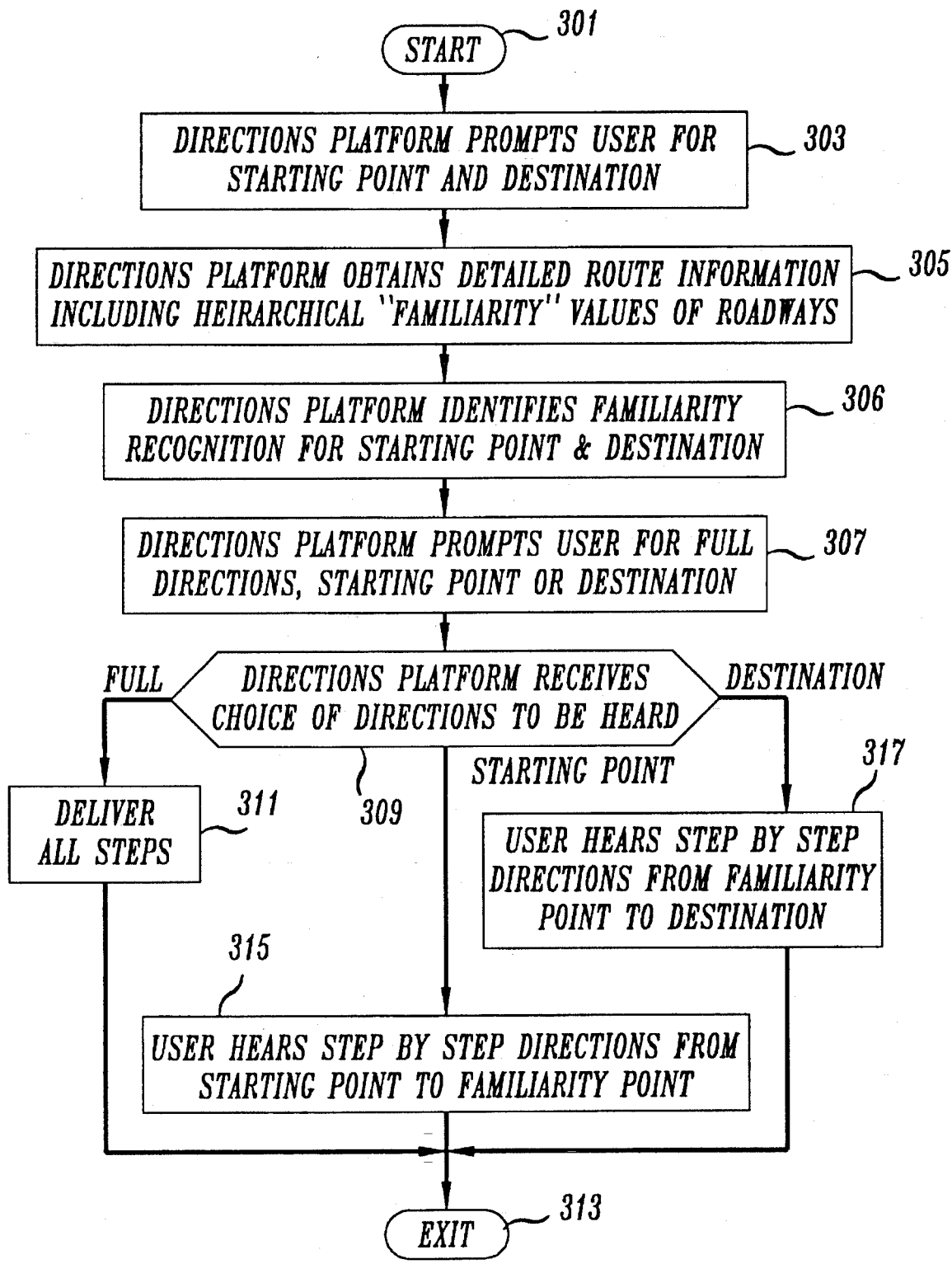
FIG. 3 shows an exemplary flowchart of the general process for implementing the principles of the invention.

FIG. 3 shows an exemplary flowchart of the general process for implementing the principles of the invention. The process begins in step 301 when a call is received at voice response unit 107 (FIG. 1) of directions platform 105. Directions platform 105 prompts the traveler for the starting point and destination of the trip in step 303 (FIG. 3). In step 305 directions platform 105 develops the steps of the directions and associates with each step a hierarchical familiarity value for the roadways listed therein. Next, in step 307 directions platform 105 prompts the user to supply information indicating whether the traveler is familiar with either the area of the starting point or the area of the destination.

Conditional branch point 309 tests to determine if the information supplied by the traveler indicated that he was familiar with the area of the starting point or the area of the destination. If the test result in step 309 is that the traveler indicated that he was familiar with neither the area of the starting point nor the area of the destination, control passes to step 311, in which all the steps of the directions are delivered to the traveler as in the prior art. Control then passes to step 313 and the process is exited.

If the test result of step 309 is that the traveler supplied information indicating that he was familiar with the area of the starting point, control passes to step 315, in which the steps of the directions from point of familiarity—which is at the end of the area of familiarity near the starting point—to the destination are supplied to the traveler. Control then passes to step 313 and the process is exited. If the test result in step 309 is that the traveler supplied information indicating that he was familiar with the area of the destination, control passes to step 317 in which the steps of the directions from the starting point until point of familiarity—which is in the area of familiarity near the destination—are supplied. Control then passes to step 313 and the process is exited.

Figure 4:
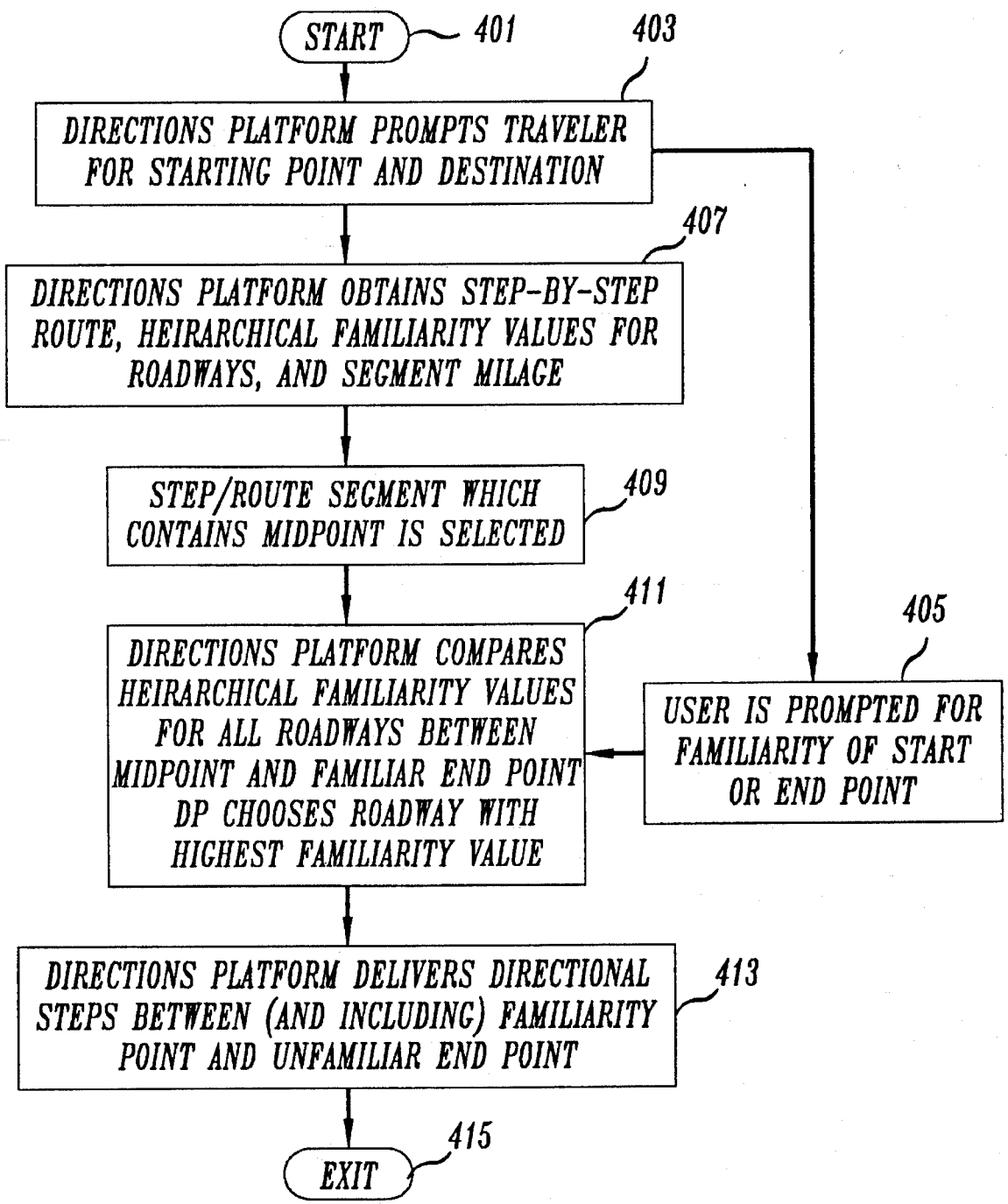
FIG. 4 shows a flowchart of a particular exemplary process for implementing the invention.

FIG. 4 shows a flowchart of a particular exemplary process for implementing the invention. The process begins in step 401 when a call is received at voice response unit 107 (FIG. 1) of directions platform 105. Directions platform 105 prompts the traveler for the starting point and destination of the trip in step 403 (FIG. 4). Next, in step 405, directions platform 105 prompts the user to supply information indicating whether the traveler is familiar with the area of the starting point or the area of the destination.

Steps 407 and 409 may be performed in parallel with step 405. In step 407, directions platform 105 develops the steps of the directions for a route from the starting point to the destination and associates with each step of the directions a hierarchical familiarity value for the roadways listed therein. In one embodiment of the invention, the mileage traveled at each step is also determined. In step 409, the midpoint step of the route is selected. The midpoint step may be selected based on either the total mileage of the route, if the mileage for each step is determined, or it may be based on the number of steps in the directions. In the case of a tie between two of the steps, an arbitrary rule may be used to break it, e.g., always select the step of the two tied steps, that is closest to the starting point, based on the same criteria by which the tied steps were determined to be tied.

Control passes to step 411, in which directions platform 105 compares the familiarity values for all roadways between the midpoint step and the end point of the directions, i.e., starting point or destination, that the user had indicated was familiar and selects the roadway with the greatest hierarchical value. The selected roadway is deemed to be the familiarity point. In step 413, directions platform 105 delivers to the traveler all the steps between (and including) the familiarity point and the end point of the directions that the user had not indicated was the familiar end. The process is then exited in step 415.

FIG. 5 shows a flowchart of another particular exemplary process for implementing the invention. The process begins in step 501 when a call is received at voice response unit 107 (FIG. 1) of directions platform 105. Directions platform 105 prompts the traveler for the starting point and destination of the trip in step 503 (FIG. 5). Next, in step 505 directions platform 105 prompts the user to supply information indicating whether the traveler is familiar with the area of the starting point or the area of the destination.

Steps 507 and 509 may be performed in parallel with step 505. In step 507 directions platform 105 develops the steps of the directions for a route from the starting point to the destination and associates with each step of the directions a hierarchical familiarity value for the roadways listed therein. Directions platform 105 then compares the familiarity values of all roadways on the route of the directions in step 509.

When control passes to conditional branch point 511 from both steps 505 and 509, conditional branch point 511 tests to determine if there is one roadway with a highest familiarity rating. If the test result in step 511 is YES, control passes to step 513, in which directions platform 105 delivers the steps of the directions that are between the highest valued roadway and the unfamiliar end point. Control then passes to step 515 and the process is exited.

If the test result in step 511 is NO, control passes to step 517, in which directions platform 105 selects the roadway from among those with tied hierarchical familiarity values that is nearest the familiar endpoint as the point of familiarity. In step 519, directions platform 105 delivers the steps of the directions that are between the highest valued roadway and the unfamiliar end point. Control then passes to step 515 and the process is exited.

In other embodiments of the invention, instead of supplying the directions as an audible voice, using speech synthesis by voice response unit 107, the steps of the directions may be supplied to the traveler electronically, e.g., in the form of a text file transmitted via data interface 115 to the traveler's specified terminal 119. Alternatively, the steps of the instructions may be transmitted via fax interface 117 for printing at the traveler's designated fax machine 121.

The foregoing merely illustrates the principles of the invention. It will thus be appreciated that those skilled in the art will be able to devise various arrangements which, although not explicitly described or shown herein, embody the principles of the invention and are thus within its spirit and scope.

I claim:

1. A method for use in delivering travel directions for a trip to a traveler, comprising the steps of:

automatically developing and storing in a memory a set of ordered steps that collectively specify travel directions along a route from a predetermined area around an endpoint of said trip to a predetermined area around the other endpoint of said trip;

automatically determining a point of familiarity of said traveler along the route specified by said set, said familiarity point being neither endpoint of said trip; and delivering the steps of said set between the area around one of said endpoints of said route and the step corresponding to said familiarity point.

2. The invention as defined in claim 1 further including the step of:

having said traveler indicate the one of said endpoints of said trip with which he is familiar;

wherein said ordered steps specify roadways to be taken, each roadway having assigned thereto a hierarchical familiarity value and in said automatically determining step said familiarity point is automatically determined to be the roadway that has the highest familiarity rating that is between the endpoint said traveler indicated he is familiar with and the midpoint of said route.

3. The invention as defined in claim 2 wherein said midpoint is based on mileage.

4. The invention as defined in claim 2 wherein said midpoint is determined by the number of steps in said set.

5. The invention as defined in claim 1 wherein said ordered steps specify roadways to be taken, each roadway having assigned thereto a hierarchical familiarity value and in said automatically determining step said familiarity point is automatically determined to be the roadway that has the highest familiarity rating along said route.

6. The invention as defined in claim 5 further including the step of:

having said traveler indicate the one of said endpoints of said trip with which he is familiar; and wherein said familiarity point is automatically determined to be the roadway closest to the endpoint with which said traveler indicated that he was familiar if there is more than one roadway with the highest familiarity rating.

7. A method for use in a system that supplies directions for travelers comprising the steps of:

storing in a memory for each roadway known to said system one of a predetermined plurality of hierarchical values;

automatically developing a set of ordered steps that collectively specify travel directions from a starting location to a destination location, those steps of said set that specify one of said roadways each including the hierarchical familiarity value of said roadway; and automatically supplying only those steps of said set that are not between a predetermined end of said travel directions and the step closest to said predetermined end that includes the highest value roadway of those roadways within said steps.

8. The invention as defined in claim 7 wherein the recipient of the travel directions specifies prior to said supplying step which of the ends of said travel directions is said predetermined end.

9. The invention as defined in claim 7 wherein said travel directions are supplied in said supplying step by speech synthesis.

10. The invention as defined in claim 7 wherein said travel directions are supplied in said supplying step as text encoded in a signal adapted to be printed by a facsimile machine.

11. The invention as defined in claim 7 wherein said database is updated based on traffic conditions.

12. A method for use in a system that supplies directions for travelers comprising the steps of:

storing in a database for each roadway known to said system one of a predetermined plurality of hierarchical values;

automatically developing a set of ordered steps that collectively specify travel directions from a starting location to a destination location, those steps of said set that specify one of said roadways each including the hierarchical familiarity value of said roadway; and automatically supplying a subset of the set of travel directions as an output the subset including only those steps from a predetermined end of said travel directions until the step closest to the end opposite said predetermined end that includes the highest value roadway, of those roadways within said travel directions, that is closest to said opposite end.

13. A method for use in a system that supplies directions for travelers comprising the steps of:

storing for each roadway known to said system one of a predetermined plurality of hierarchical values;

automatically developing a set of steps that collectively specify travel directions from a starting location to a destination location, those steps of said set that specify one of said roadways each individually specifying the hierarchical familiarity value of said roadway; and automatically supplying a subset of said set of directions to a traveler over a communications link, said subset being determined by automatically excluding from said set of travel directions all steps from one end of said travel directions until the step closest to said one end that includes the highest value roadway of those roadways within said steps, whereby all of said steps of said set are not delivered.

14. A method for use in a system that supplies directions for travelers comprising the steps of:

storing in a database for each roadway known to said system one of a predetermined plurality of hierarchical values;

automatically developing a set of ordered steps that collectively specify travel directions from a starting location to a destination location, those steps of said set that specify one of said roadways each including the hierarchical familiarity value of said roadway;

automatically determining if (i) which end of said travel directions said traveler is familiar with and (ii) a point of familiarity which marks the end of said travelers familiarity with said end, said point of familiarity being a point other than either said starting location or said destination location; and automatically supplying as an output only those steps of said travel directions that are between said point of familiarity and the end opposite said end with which said traveler is familiar.

* * * * *